United States Patent
Howell et al.

(10) Patent No.: US 6,682,671 B1
(45) Date of Patent: Jan. 27, 2004

(54) METHOD OF MANUFACTURING FIBER-REINFORCED STRUCTURES INCORPORATING RECYCLED CARPET FIBERS

(75) Inventors: Grady A. Howell, Chattanooga, TN (US); Philip G. Malone, Vicksburg, MS (US); Joe Gain Tom, Vicksburg, MS (US); Charles Arthur Weiss, Jr., Clinton, MS (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 09/572,942

(22) Filed: May 18, 2000

(51) Int. Cl.$^7$ .......................... B28B 1/52; B28B 1/087; B28B 1/16
(52) U.S. Cl. ......................... 264/71; 264/86; 264/87; 264/108; 264/136; 264/257; 264/333; 264/913; 427/355; 427/368
(58) Field of Search ................ 264/71, 86, 87, 264/257, 333, 913, 108, 265, 136; 427/355, 368

(56) References Cited

U.S. PATENT DOCUMENTS

| | | | |
|---|---|---|---|
| RE27,109 E | | 3/1971 | Videen |
| 3,961,012 A | * | 6/1976 | DiMaio ........................ 264/112 |
| 3,972,972 A | | 8/1976 | Yano et al. .................. 264/117 |
| 4,267,136 A | * | 5/1981 | Bijen .......................... 264/257 |
| 4,450,022 A | * | 5/1984 | Galer ............................ 118/56 |
| 4,600,637 A | * | 7/1986 | Kafka et al. ................. 264/145 |
| 4,655,982 A | * | 4/1987 | Meyer et al. ................ 264/131 |
| 4,668,548 A | | 5/1987 | Lankard ......................... 428/63 |
| 4,778,718 A | * | 10/1988 | Nicholls ....................... 264/257 |
| 4,787,597 A | | 11/1988 | Yokota et al. ............... 249/113 |
| 4,856,754 A | | 8/1989 | Yokota et al. ............... 249/113 |
| 4,882,114 A | * | 11/1989 | Radvan et al. .............. 264/129 |
| 5,078,937 A | | 1/1992 | Eela ............................ 264/109 |
| 5,139,722 A | | 8/1992 | Lawton ......................... 264/86 |
| 5,333,357 A | * | 8/1994 | Duncan ......................... 19/107 |
| 5,599,095 A | * | 2/1997 | Elkin .......................... 366/154.1 |
| 5,635,252 A | * | 6/1997 | Fraser et al. ................. 264/105 |
| 5,662,994 A | * | 9/1997 | Funger et al. ............... 442/413 |
| 5,724,783 A | | 3/1998 | Mandish .................... 52/745.05 |
| 5,729,936 A | | 3/1998 | Maxwell ..................... 52/220.2 |
| 5,879,802 A | * | 3/1999 | Beard et al. ................. 428/174 |

FOREIGN PATENT DOCUMENTS

| | | | | |
|---|---|---|---|---|
| GB | 2180565 A | * | 4/1987 | ............ D04H/1/64 |
| JP | 53-34820 A | * | 3/1978 | ........... B32B/13/14 |
| JP | 10-100128 A | * | 4/1998 | ............. B28B/1/08 |

OTHER PUBLICATIONS

Machine translation of JP–10–100128–A, Aug. 21, 2002, JPO website.*

* cited by examiner

Primary Examiner—Michael Colaianni
Assistant Examiner—Michael I. Poe
(74) Attorney, Agent, or Firm—Earl H. Baugher, Jr.

(57) ABSTRACT

An initial process for preparing material to use in manufacturing fiber-reinforced structures. One embodiment envisions a method of manufacturing a cement board. The initial process includes providing an open mat of recycled carpet fibers in a container, placing a mortar mixture directly over the fiber mat, distributing the mortar through the fiber mat by moving a comb having bent tines through the mortar-fiber mixture, and vibrating the mortar-fiber mixture substantially simultaneously with the distribution of mortar through the fiber. Also provided is a method for making the final product.

16 Claims, 2 Drawing Sheets

METHOD OF MANUFACTURING FIBER-REINFORCED STRUCTURES INCORPORATING RECYCLED CARPET FIBERS

FIELD OF THE INVENTION

The present invention is directed to a process for making fiber-reinforced structure, and more particularly to a method of manufacturing a cement board incorporating recycled carpet fiber.

BACKGROUND

Various techniques are presently available for making cement boards, as illustrated in U.S. Pat. Nos. Re. 271,109; 3,972,972; 4,668,548; 4,856,754; 5,787,597; 5,078,937; 5,724,783; 5,139,722; and 5,729,936. In particular, U.S. Re. Pat. No. 27,109 to Viden discloses a method and apparatus for producing special surfaces on panel board wherein the surface layer is simultaneously doctored onto a lower carrying layer and provided with an irregular top surface by a rotating roll arranged at an angle to the movement of the carrier material.

U.S. Pat. No. 3,972,972 to Yano et al. discloses a process of continuously producing a board of cement-like material reinforced by fibrous material wherein a granular mixture of the cement-like material and fibrous material is formed into a board under compression, and optionally with the addition of water.

U.S. Pat. No. 4,668,548 to Lankard discloses a method of producing a concrete overlay by drilling anchor holes in the concrete and placing a layer of fibers on the exposed surface and infiltrating a flowable cement slurry throughout the fibers and into the integral holes. Curing the slurry procedures an overlay with integral fiber-reinforced anchor portions.

U.S. Pat. No. 4,856,754 to Yokota et al. discloses a shuttering for forming concrete which includes a plate with a plurality of through holes openings on both its face and reverse, and double woven fabric consisting of a face tissue that permits passages of water, but prevents concrete from passing in the reverse tissue opposed to the face of the plate.

U.S. Pat. No. 4,787,597 to Yokota et al. discloses concrete forms including a first cloth sheet permitting surplus water and air contained in concrete cast in the form to pass therethrough but capable of blocking the passage of concrete, a second cloth sheet permeably secured to the first sheet permitting the surplus water and air to pass between and through the first and second sheets and to be absorbed into the second sheet as well as the first sheet and a support plate.

U.S. Pat. No. 5,078,927 to Eela discloses a method and system for producing a slab-like product in which a fibrous material is mixed with a settable material. The blank shaping units of the system are provided with stud-like material dispersing members.

U.S. Pat. No. 5,724,783 to Mandish discloses a panel manufactured by using Portland cement and waste aggregate materials, including used fiberglass insulation, recycled polystyrene, rubber tires, and old carpet material.

U.S. Pat. No. 5,139,722 to Lawton discloses pressing wet concrete between a ram and a mold to compact the concrete and express water from it so as to produce a molded slab. A layer of filter material is provided between the ram or the base of the mold and the concrete, and the filter material is secured by a discontinuous coat of adhesive applied as a transfer to the ram and/or to the base of the mold.

U.S. Pat. No. 5,729,936 to Maxwell discloses forming prefabricated panels by compressing a fiber slurry which may be composed of waste fiber products such as waste paper, cardboard, straw, leaves and grass clippings.

In conventional techniques, an attempt is made to add the fiber to the mortar during the final stages of the preparation of the mortar, i.e., after all of the constituents of the mortar have been worked into a fine paste. However, the fiber "balls-up" to some extent as it is wetted by the mortar. These fiber balls appear in varying amounts making it impossible to incorporate the fiber into the mixture and making it impossible to ensure that the fiber is uniformly distributed throughout the mortar mixture. Any blade or whisk system used after the fiber is added, ends up matted with fibers that may have wrapped around the mixing elements, such as the blade or wire, when the mixture is rotated. Drum mixing typically rolls the fiber into clumps, in much the same way as a rotary pelletizer operates to make pellets or balls. The rotating drum mixer cannot consistently produce uniform blending of the fiber and mortar.

In summary, the present techniques are not satisfactory in that they do not properly mix the fluid mortar into a tangled mat of fiber to thereby produce a board that does not have air-filled voids or have an irregular or rough surface.

In view of the above, there is a need in the industry for a technique that produces a strong cement board using recycled carpet fiber as a reinforcement material.

OBJECTS AND SUMMARY OF THE INVENTION

An object of the present invention is to provide a method of manufacturing a cement board incorporating recycled carpet fiber which produces a strong cement board even with a fluid mortar because the process specifies the use of a high-range water reducing agent to minimize the amount of water that is used, and further includes a step in which the fiber-mortar mixture is pressed between layers of filter fabric to assure that any problem of excess water is eliminated.

Another object of the present invention is to provide a method of manufacturing a cement board incorporating recycled carpet fiber in which the problem of air-filled voids or "bugholes", that might produce an irregular, rough surface on the finished cement board, is eliminated.

Yet another object of the present invention is to provide a method of manufacturing a cement board incorporating recycled carpet fiber which produces a cement board with smooth surface.

Still yet another object of the present invention is to provide a method of manufacturing a cement board incorporating recycled carpet fiber which produces a uniform mixture of mortar and fiber from tangled recycled fibers, such as processed post-consumer carpet materials.

A further object of the present invention is to provide a method of manufacturing a cement board incorporating recycled carpet fiber wherein the use of tangled fibers produces a cement board in which the fiber has high pull-out resistance compared to the conventional short discrete fiber materials used in most concrete reinforcement applications.

Yet a further object of the present invention is to provide a method of manufacturing a cement board incorporating recycled carpet fiber in which the mixed fiber and mortar can be placed as a discrete layer thereby making it possible to make a cement board that has two exterior layers containing fiber and a central layer containing only mortar. This construction places the fiber reinforcement in a location in the cement board where it is needed to resist flexure.

Still yet a further object of the present invention is to provide a method of manufacturing a cement board incorporating recycled carpet fiber which utilizes comb-type mixing to incorporate a Portland cement-based mortar into a tangled mass of fiber.

In accordance with the present invention, a method of manufacturing a cement board includes providing an open mat of recycled carpet fibers in a container, placing the mortar mixture directly over the fiber mat, distributing the mortar through the fiber mat by moving a comb through the mortar-fiber mixture, and vibrating the mortar-fiber substantially simultaneously with the distribution of mortar through the fiber.

BRIEF DESCRIPTION OF THE DRAWINGS

The above and other objects and novel features of the present invention will become apparent from the following description of the invention, illustrated in the drawings, in which.

DETAILED DESCRIPTION OF THE INVENTION

In the method of the invention, the carpet fiber is initially processed by cutting the used carpet into strips. The strips are shredded, chopped and hammered and screened to separate the components of the carpet. For instance, the latex and the calcium carbonate are removed by sieving. The process produces a tangled mass of fibers that varies with the type of fiber in the carpet. Typically, the mass of fiber is a mixture of nylon, polyester and polypropylene fibers. The tangled mass is then carded or combed to create an open mat of fibers.

Next, a low-viscosity mortar mixture is prepared by mixing Portland cement, sand, water, a dispersing agent and a high-range water reducer. An example of the proportions needed for such a mortar is as follows:

| | |
|---|---|
| Type I-II Portland Cement | 500 grams |
| Fine aggregate | 1000 grams |
| (quartz sand meeting the specifications set out in ASTM C778) | |
| Water | 230 grams (cc) |
| Dispersing Agent | 1 to 2 grams |
| (METHOCEL K-1000 ® from Dow Chemical Co., Midland, MI) | |
| High-range Water Reducer | 4 ml |
| (SIKAMENT 300 ® or SIKAMENT S-10 ® from Sika Corp. Lyndhurst NJ) | |
| w/c = 0.46 | |

Figure 1:
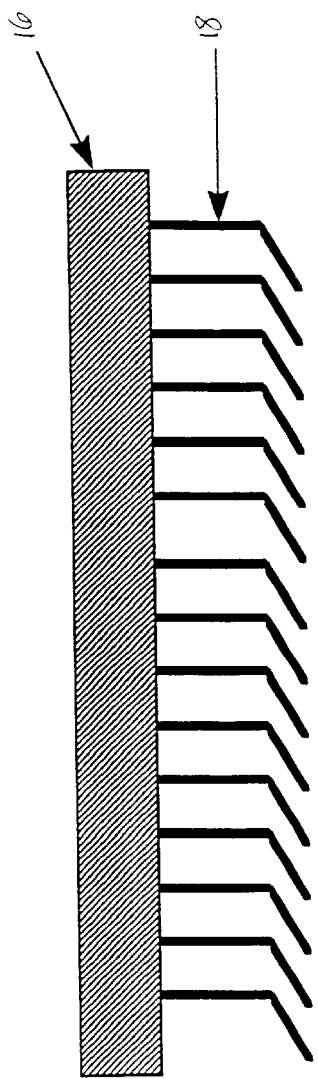
FIG. 1 is a schematic illustration of a mixing comb used in the method of the present invention.
Figure 2:
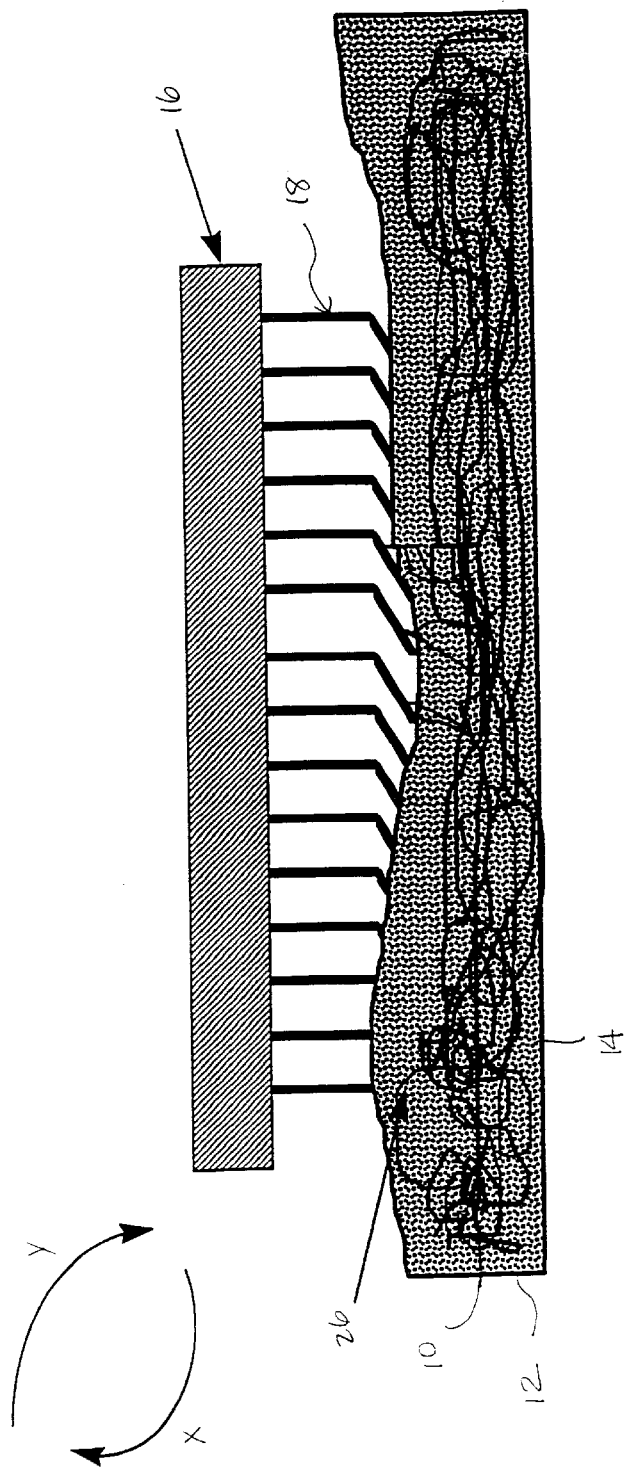
FIG. 2 is a schematic illustration of the mixing motion of the comb in the mortar.

As best shown in FIG. 2, the fiber mat 10 is arranged in a layer on the bottom of a container 12 and the mortar mixture 14 is placed as a layer directly over the mat. The container with the fiber mat and mortar is placed on a vibratory table (not shown). The vibrator is switched on and a metal comb 16 (FIG. 1) with multiple bent wire-teeth 18 (in the style of a curry comb) is moved across and in-and-out of the fiber and mortar layers (see arrows x and y). The teeth 18 of the comb 16 transmit the motion of the vibrating mold into the mortar mixture 14, and the motion of the comb 16 separates the fibers 10 so that the mortar 14 can move into the mat 10. The angled teeth 18 of the comb 16 pull the fibers 10 up into the mortar mixture 14 distributing the mortar evenly through the fiber mat 10 (FIG. 2). Care is taken to lift the comb 16 frequently so that the fiber mat 10 remains as a continuous layer from one side of the container 12 to the other (FIG. 2).

Figure 3:
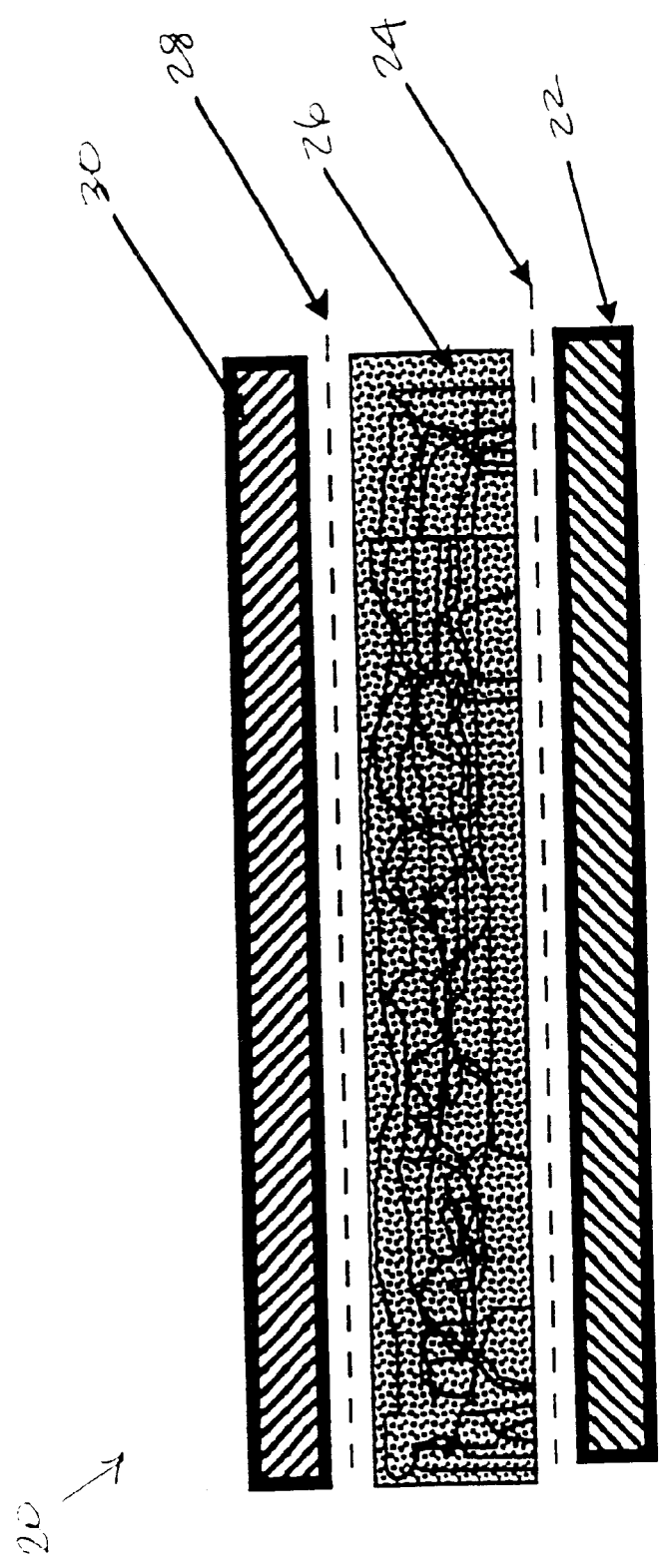
FIG. 3 is a schematic cross-sectional illustration of a mold, showing the fiber-mortar mixture placed therein for forming a board.

After the mat 10 containing the mixture of fiber and mortar 14 has been prepared, it is transferred from the container 12 to a box-like mold 20 (FIG. 3). Drain holes (not shown) are drilled through the bottom of the mold 20 to allow water to escape, and the bottom of the mold 22 is covered with a layer 24 of fabric that will act as a filter which will allow water to escape through the drain holes, but retain the cement and sand. The non-woven form liner material, ZEMDRAIN® (DuPont Non-wovens, Old Hickory, Tenn.) is an example of a suitable material. The mortar-fiber mixture 26 is placed as an even layer over the liner filter material 24. The thickness of the fiber-mortar layer 26 is adjusted so that it is slightly thicker, preferably 1 to 5% thicker, than the thickness of the finished cement board. Another fabric filter layer 28, preferably a piece of ZEMDRAIN®, is placed over the mortar-fiber mat 26 and a lid 30, that has been drilled through with drain holes (not shown), is placed over the filter fabric (ZEMDRAIN®) 28 and pressed down evenly. Pressure is maintained on the top 30 of the mold 20 while the mold 20 is vibrated. After the mortar-fiber mixture 26 has consolidated and the thickness of the mortar-fiber layer 26 is reduced to that desired for the finished panel, vibration is stopped. The mold 20 and its contents are then transferred to a warm, moist storage area to allow the mortar-fiber mixture 26 to set and cure.

When the cement board (hardened mortar-fiber layer 26) has achieved sufficient strength so that it will not crack when it is de-molded (typically this takes 3 to 4 days); the cement board is removed from the mold 20. The filter fabric 24, 28 is removed and the "green" (not completely cured) cement board is maintained in a moist condition until it cures and achieves a strength that approaches its ultimate strength. Typically, this takes about 28 days at 23° C. The rate of strength gain can be accelerated by exposing the curing board to steam or moist heat. After curing, the finished cement board can be trimmed with a diamond saw, if desired, and packed for transportation and use in construction.

The method of vibrating and combing the mortar mixture 14 into a mat 10 of fibers is the desired way to disperse the fibers through the mixture 26 without first separating and chopping the fibers to a convenient size, i.e., 20 to 25 mm length. A steel fiber-reinforced concrete has been known to be manufactured by placing a layer of mortar over a layer of fibers and vibrating the layers to mix them (Josifek, C. and Lankard, D. 1987. "SIFCON: Slurry infiltrated fiber concrete." Proc. Fiber Reinforced Concrete Int. Symp., 7.15–7.23). This works with dense fibers such as steel fibers, but will not work with light fibers. It is therefore necessary to use a combing action to mix the low-density fibers like nylon or polypropylene with mortar.

The use of filter fabric layers 28 and 24, and drainage holes above and below the mortar-fiber layer 26, during molding, results in a stronger panel than could be produced by simple casting. The increased cement/water ratio and the lack of surface "bugholes" produced by air bubbles results in a more architecturally acceptable panel than simple casting would produce.

The ability of the technique of the present invention to use tangled or matted fiber 10 makes it much more economical in manufacturing cement board than the methods that require the use of virgin fiber or recycled fiber which has been chopped, cleaned and separated. The use of a tangled mass of fibers also increases the pull-out resistance of the individual fibers over the pull-out resistance of conventional short, 20–25 mm long, fibers.

The invention can be used in any mixture system where a slurry material must be mixed with a fiber-reinforcement. This would include operations, such as:

1) Manufacture of wall board or plasterboard;
2) Production of fiber-reinforced molded plastic panels, such as fiber-reinforced epoxy;
3) Manufacture of fiber-reinforced paper board; and
4) Fiber reinforcement of soil embankments, or embankments stabilized with soil-Portland cement mixtures.

While this invention has been described as having preferred ranges, steps, materials, or designs, it is understood that it is capable of further modifications, uses and/or adaptations of the invention following in general the principle of the invention, and including such departures from the present disclosure, as those come within the known or customary practice in the art to which the invention pertains and as may be applied to the central features hereinbefore set forth, and fall within the scope of the invention and of the appended claims.

What is claimed is:

1. A method of manufacturing a cement board, comprising the steps of:
   a) providing an open mat of recycled carpet fibers on a support surface;
   b) providing a mortar mixture;
   c) placing the mortar mixture over the fiber mat;
   d) distributing the mortar mixture through the fiber mat by moving a comb through the mortar-fiber mixture, wherein said comb has a plurality of bent tines; and
   e) vibrating the mortar-fiber mixture substantially simultaneously with the step d).

2. The method of claim 1 in which said mortar mixture comprises:
   Portland cement;
   fine aggregate;
   water;
   at least one dispersing agent; and
   at least one water reducer.

3. The method of claim 1 which said mortar mixture comprises components in the following proportions:
   500 grams of Type I–II Portland cement;
   1000 grams fine aggregate;
   230 cc water;
   2 grams dispersing agent; and
   4 mL high-range water reducer.

4. The method of claim 1 in which said providing an open mat of recycled carpet fibers comprises:
   cutting carpet into strips:
      processing said strips by a method selected from the group consisting essentially of: shredding, chopping, hammering, screening and any combination thereof, wherein said processing separates said strips into components;
      removing non-fibrous components from said components, said non-fibrous components selected from the group consisting essentially of: latex, calcium carbonate, and any combination thereof,
   wherein said removing of non-fibrous components yields a tangled mass essentially comprising only said recycled carpet fibers; and
      carding said tangled mass of recycled carpet fibers to establish said open mat of recycled carpet fibers.

5. A method of initially processing material to be used in a new structure reinforced with fibers, comprising:
   separating said fibers from a used structure for recycling said fibers to said new structure;
   forming said fibers into a pre-specified shape;
   placing said pre-specified shape of said fibers in a container, said container being placed on an arrangement that may be vibrated;
   combining components for use as a first fluid mixture suitable for coating said pre-specified shape and, upon curing, forming a solid;
   covering said pre-specified shape with said first fluid mixture to establish a second fluid mixture containing said pre-specified shape and said first fluid mixture;
   vibrating said container;
   combing said second fluid mixture with a comb,
   wherein said comb has a plurality of tines bent at an oblique angle at the end of said tines, and
   wherein said combining provides a combing action in both the plane of said second fluid mixture and a plane generally perpendicular thereto, and
   wherein said combing enables said first fluid mixture to fully coat said pre-specified shape of said fibers while maintaining said pre-specified shape of said fibers as a continuous, evenly distributed layer within said second fluid mixture.

6. The method of claim 5 which said used structure is carpet.

7. The method of claim 6 which said separating of said fibers from said carpet comprises:
   cutting said carpet into strips:
      processing said strips by a method selected from the group consisting essentially of: shredding, chopping, hammering, screening and any combination thereof, wherein said processing separates said strips into components;
      removing non-fibrous components from said components, said non-fibrous components selected from the group consisting essentially of: latex, calcium carbonate, and any combination thereof,
   wherein said removing of non-fibrous components yields a tangled mass essentially comprising only said fibers; and
      carding said tangled mass of said fibers to establish said pre-specified shape.

8. The method of claim 7 in which said new structure is a cement board.

9. The method of claim 8 in which said first fluid mixture comprises:
   Portland cement;
   fine aggregate;
   water;
   at least one dispersing agent; and
   at least one water reducer.

10. The method of claim 8 in which said first fluid mixture comprises components in the following proportions:
  500 grams of Type I–II Portland cement;
  1000 grams fine aggregate;
  230 cc water;
  2 grams dispersing agent; and
  4 mL high-range water reducer.

11. A method of manufacturing a new structure reinforced with fibers, comprising:
  separating said fibers from a used structure for recycling said fibers to said new structure;
  forming said fibers into a pre-specified shape;
  placing said pre-specified shape of said fibers in a container, said container being placed on an arrangement that may be vibrated;
  combining components for use as a first fluid mixture suitable for coating said pre-specified shape and, upon curing, forming a solid;
  covering said pre-specified shape with said first fluid mixture to establish a second fluid mixture containing said pre-specified shape and said first fluid mixture;
  vibrating said container;
  combing said second fluid mixture with a comb,
  wherein said comb has a plurality of tines bent at an oblique angle at the end of said tines, and
  wherein said combining provides a combing action in both the plane of said second fluid mixture and a plane generally perpendicular thereto, and
  wherein said combing enables said first fluid mixture to fully coat said pre-specified shape of said fibers while maintaining said pre-specified shape of said fibers as a continuous, evenly distributed layer within said second fluid mixture;
  transferring said combed, vibrated second fluid mixture to a mold having a top and a bottom portion each incorporating drain holes for passage of water,
  wherein said mold is lined along at least said top and bottom with porous filter material that permits passage of water from said combed, vibrated second fluid mixture while retaining solids contained therein;
  closing said mold by affixing said top portion;
  compressing said combed, vibrated second fluid mixture to remove excess water;
  vibrating said mold for a first pre-specified time to assist in consolidation of said combed, vibrated, second fluid mixture;
  allowing said compressed, consolidated second fluid mixture in said mold to cure for a pre-specified time to form a new structure; and
  removing said new structure from said mold upon expiration of said pre-specified time.

12. The method of claim 11 in which said used structure is carpet.

13. The method of claim 12 in which said separating of said fibers from said carpet comprises:
  cutting said carpet into strips:
    processing said strips by a method selected from the group consisting essentially of: shredding, chopping, hammering, screening and any combination thereof,
  wherein said processing separates said strips into components;
  removing non-fibrous components from said components, said non-fibrous components selected from the group consisting essentially of: latex, calcium carbonate, and any combination thereof,
  wherein said removing of non-fibrous components yields a tangled mass essentially comprising only said fibers; and
    carding said tangled mass of said fibers to establish said pre-specified shape.

14. The method of claim 13 which said new structure is a cement board.

15. The method of claim 14 in which said first fluid mixture comprises:
  Portland cement;
  fine aggregate;
  water;
  at least one dispersing agent; and
  at least one water reducer.

16. The method of claim 14 in which said first fluid mixture comprises components in the following proportions:
  500 grams of Type I–II Portland cement;
  000 grams fine aggregate;
  230 cc water;
  2 grams dispersing agent; and
  4 mL high-range water reducer.

* * * * *